US012673562B2

(12) United States Patent
Ham

(10) Patent No.: US 12,673,562 B2
(45) Date of Patent: Jul. 7, 2026

(54) WIRELESS CHARGING SYSTEM, WIRELESS CHARGING METHOD, AND ELECTRIC VEHICLE

(71) Applicant: LG ENERGY SOLUTION, LTD., Seoul (KR)

(72) Inventor: Seok-Hyeong Ham, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 823 days.

(21) Appl. No.: 17/788,661

(22) PCT Filed: May 7, 2021

(86) PCT No.: PCT/KR2021/005770
§ 371 (c)(1),
(2) Date: Jun. 23, 2022

(87) PCT Pub. No.: WO2021/246667
PCT Pub. Date: Dec. 9, 2021

(65) Prior Publication Data
US 2023/0035811 A1      Feb. 2, 2023

(30) Foreign Application Priority Data

Jun. 3, 2020      (KR) ........................ 10-2020-0067106

(51) Int. Cl.
B60L 53/12 (2019.01)
B60L 53/20 (2019.01)
(Continued)

(52) U.S. Cl.
CPC .............. B60L 53/12 (2019.02); B60L 53/20 (2019.02); H02J 7/50 (2026.01); H02J 50/12 (2016.02);
(Continued)

(58) Field of Classification Search
CPC ...... B60L 53/12; B60L 53/20; B60L 2210/30; B60L 58/21; H02J 7/0013; H02J 50/12;
(Continued)

(56) References Cited

U.S. PATENT DOCUMENTS

2011/0006612 A1      1/2011      Kozakai
2012/0001485 A1*      1/2012      Uchida ................... H02J 50/40
307/11
(Continued)

FOREIGN PATENT DOCUMENTS

CN      106059110 A      10/2016
CN      110601377 A      12/2019
(Continued)

OTHER PUBLICATIONS

International Search Report for PCT/KR2021/005770 (PCT/ISA/210) mailed on Aug. 19, 2021.
(Continued)

*Primary Examiner* — Julian D Huffman
*Assistant Examiner* — Aiman Bickiya
(74) *Attorney, Agent, or Firm* — Birch, Stewart, Kolasch & Birch, LLP

(57)      ABSTRACT

A wireless charging system includes a first power receiving device connected in parallel to a first battery and including a first sub resonant circuit having a first resonant frequency, a second power receiving device connected in parallel to a second battery and including a second sub resonant circuit having a second resonant frequency, and a power transmitting device. The power transmitting device is for determining a charging order between the first battery and the second battery. The power transmitting device wirelessly transmits first alternating current (AC) power having the first resonant frequency to the first sub resonant circuit when the first battery is selected according to the charging order and
(Continued)

wirelessly transmits second AC power having the second resonant frequency to the second sub resonant circuit when the second battery is selected according to the charging order.

6 Claims, 6 Drawing Sheets

(51) Int. Cl.
| | | |
|---|---|---|
| *H02J 7/50* | (2026.01) | |
| *H02J 50/12* | (2016.01) | |
| *H02J 50/40* | (2016.01) | |
| *H02J 105/30* | (2026.01) | |

(52) U.S. Cl.
CPC ........... *H02J 50/40* (2016.02); *B60L 2210/30* (2013.01); *H02J 2105/30* (2026.01); *H02J 2207/20* (2020.01)

(58) Field of Classification Search
CPC .... H02J 50/40; H02J 2207/20; H02J 2310/40; H02J 7/0018; H02J 50/402; H02M 3/01; H02M 3/33561; Y02T 10/70; Y02T 10/7072; Y02T 10/72; Y02T 90/14; Y02T 90/16; Y02T 90/12; H01F 3/14; H01F 2005/027; B60Y 2200/91
USPC ......................................................... 320/108
See application file for complete search history.

(56) References Cited

U.S. PATENT DOCUMENTS

| | | | |
|---|---|---|---|
| 2012/0098348 A1* | 4/2012 | Inoue ..................... | B60L 50/61 |
| | | | 307/104 |
| 2013/0154386 A1 | 6/2013 | Bae | |
| 2015/0091379 A1 | 4/2015 | Uchida | |
| 2015/0207333 A1* | 7/2015 | Baarman ................. | H02J 50/60 |
| | | | 307/104 |
| 2015/0298560 A1 | 10/2015 | Keeling et al. | |
| 2016/0028251 A1 | 1/2016 | Hur et al. | |
| 2018/0226829 A1* | 8/2018 | Bae ........................ | H02J 50/12 |
| 2018/0241223 A1 | 8/2018 | Bae | |
| 2019/0165616 A1 | 5/2019 | Lee et al. | |

FOREIGN PATENT DOCUMENTS

| | | | | |
|---|---|---|---|---|
| KR | 10-2011-0121623 A | 11/2011 | | |
| KR | 10-1153179 B1 | 6/2012 | | |
| KR | 10-2012-0077444 A | 7/2012 | | |
| KR | 10-2013-0005571 A | 1/2013 | | |
| KR | 10-2013-0070451 A | 6/2013 | | |
| KR | 10-2014-0060186 A | 5/2014 | | |
| KR | 10-2014-0085201 A | 7/2014 | | |
| KR | 10-2016-0011994 A | 2/2016 | | |
| KR | 10-2016-0023019 A | 3/2016 | | |
| KR | 10-2016-0051931 A | 5/2016 | | |
| KR | 10-2017-0020143 A | 2/2017 | | |
| KR | 10-2019-0062710 A | 6/2019 | | |
| WO | WO-2012091208 A1 * | 7/2012 | .............. | H02J 7/025 |

OTHER PUBLICATIONS

Extended European Search Report for European Application No. 21816667.6, dated May 23, 2023.

* cited by examiner

WIRELESS CHARGING SYSTEM, WIRELESS CHARGING METHOD, AND ELECTRIC VEHICLE

TECHNICAL FIELD

The present disclosure relates to technology for wirelessly charging a battery using magnetic resonance.

The present application claims the benefit of Korea patent Application No. 10-2020-0067106 filed on Jun. 3, 2020 with the Korean Intellectual Property Office, the disclosure of which is incorporated herein by reference in its entirety.

BACKGROUND ART

Recently, there has been a rapid increase in the demand for portable electronic products such as laptop computers, video cameras and mobile phones, and with the extensive development of electric vehicles, accumulators for energy storage, robots and satellites, many studies are being made on high performance batteries that can be charged and discharged repeatedly.

Currently, commercially available batteries include nickel-cadmium batteries, nickel-hydrogen batteries, nickel-zinc batteries, lithium batteries and the like, and among them, lithium batteries have little or no memory effect, and thus they are gaining more attention than nickel-based batteries for their advantages that recharging can be done whenever it is convenient, the self-discharge rate is very low and the energy density is high.

In general, a battery pack includes a plurality of batteries connected in series. To wirelessly charge the plurality of batteries individually, a power receiving device needs to be provided to each battery.

Conventionally, to wirelessly transmit alternating current (AC) charging power to a plurality of power receiving devices in a one-to-one relationship, a plurality of power transmitting devices is installed in a wireless charging system. For example, to individually charge 10 batteries, 10 power receiving devices and 10 power transmitting devices are required.

Meanwhile, to effectively perform the wireless charge of the plurality of batteries, it is necessary to monitor battery information (for example, voltage, etc.) of each battery. To this end, a wireless communication circuit of the power receiving device transmits the battery information to a wireless communication circuit of the power transmitting device, and the power transmitting device controls the charge of each battery based on the received battery information.

However, high costs are required to manufacture the wireless charging system including the plurality of power receiving devices and the plurality of power transmitting devices, each equipped with the wireless communication circuit, and the volume and weight of the entire wireless charging system increase. Additionally, when a communication error occurs in the wireless communication circuit provided in the power receiving device and/or the power transmitting device, it is impossible to transmit and receive the battery information.

DISCLOSURE

Technical Problem

The present disclosure is designed to solve the above-described problem, and therefore the present disclosure is directed to providing a wireless charging system, a wireless charging method and an electric vehicle, in which a single power transmitting device wirelessly transmits an alternating charging current individually to a plurality of power receiving devices using magnetic resonance.

The present disclosure is further directed to providing a wireless charging system, a wireless charging method and an electric vehicle, in which battery information of a battery connected to a power receiving device is acquired (estimated) based on the voltage and current of alternating current (AC) power wirelessly transmitted to the power receiving device without wireless communication of a power transmitting device with the power receiving device.

These and other objects and advantages of the present disclosure may be understood by the following description and will be apparent from the embodiments of the present disclosure. In addition, it will be readily understood that the objects and advantages of the present disclosure may be realized by the means set forth in the appended claims and a combination thereof.

Technical Solution

A wireless charging system according to an aspect of the present disclosure includes a first power receiving device connected in parallel to a first battery and including a first sub resonant circuit having a first resonant frequency, a second power receiving device connected in parallel to a second battery and including a second sub resonant circuit having a second resonant frequency, and a power transmitting device including a main resonant circuit. The power transmitting device is configured to determine, in a preliminary charging mode, a charging order between the first battery and the second battery. The power transmitting device is configured to wirelessly transmit, in a normal charging mode, first alternating current (AC) power having the first resonant frequency to the first sub resonant circuit through the main resonant circuit when the first battery is selected according to the charging order. The power transmitting device is configured to wirelessly transmit, in the normal charging mode, second AC power having the second resonant frequency to the second sub resonant circuit through the main resonant circuit when the second battery is selected according to the charging order.

The first sub resonant circuit may include a first sub coil and a first sub capacitor connected in series. The second sub resonant circuit may include a second sub coil and a second sub capacitor connected in series.

The first power receiving device may further include a first rectification circuit configured to convert the first AC power received by the first sub resonant circuit to first direct current (DC) power, and supply the first DC power to the first battery.

The second power receiving device may further include a second rectification circuit configured to convert the second AC power received by the second sub resonant circuit to second DC power, and supply the second DC power to the second battery.

The power transmitting device may be configured to wirelessly transmit, in the preliminary charging mode, the first AC power during a first main time. The power transmitting device may be configured to record first main sensing information indicating AC voltage and AC current of the first AC power. The power transmitting device may be configured to wirelessly transmit first auxiliary power having a first auxiliary frequency during a first auxiliary time. The power transmitting device may be configured to record first auxiliary sensing information indicating AC voltage and AC current of the first auxiliary power. The power transmitting device may be configured to determine a first DC voltage of the first battery based on the first main sensing information and the first auxiliary sensing information. The power transmitting device may be configured to wirelessly transmit the second AC power during a second main time. The power transmitting device may be configured to record second main sensing information indicating AC voltage and AC current of the second AC power. The power transmitting device may be configured to wirelessly transmit second auxiliary power having a second auxiliary frequency during a second auxiliary time. The power transmitting device may be configured to record second auxiliary sensing information indicating AC voltage and AC current of the second auxiliary power. The power transmitting device may be configured to determine a second DC voltage of the second battery based on the second main sensing information and the second auxiliary sensing information. The power transmitting device may be configured to determine the charging order between the first battery and the second battery based on the first DC voltage and the second DC voltage.

The power transmitting device may further include a power generation circuit configured to selectively supply the main resonant circuit with the first AC power, the first auxiliary power, the second AC power and the second auxiliary power, a sensing circuit configured to sense the AC voltage and the AC current of the first AC power, the second AC power and the second auxiliary power supplied to the main resonant circuit, and a control circuit operably coupled to the main resonant circuit, the power generation circuit and the sensing circuit.

The main resonant circuit may include a main coil and a variable capacitor connected in series. The control circuit may be configured to adjust a capacitance of the variable capacitor to be equal to one of a first main capacitance, a first auxiliary capacitance, a second main capacitance and a second auxiliary capacitance that are different from one another.

The first resonant frequency may be equal to a resonant frequency by a main inductance of the main coil and the first main capacitance. The first auxiliary frequency may be equal to a resonant frequency by the main inductance and the first auxiliary capacitance. The second resonant frequency may be equal to a resonant frequency by the main inductance and the second main capacitance. The second auxiliary frequency may be equal to a resonant frequency by the main inductance and the second auxiliary capacitance.

An electric vehicle according to another aspect of the present disclosure may include the wireless charging system.

A wireless charging method according to still another aspect of the present disclosure is for a first battery connected in parallel to a first sub resonant circuit having a first resonant frequency and a second battery connected in parallel to a second sub resonant circuit having a second resonant frequency. The wireless charging method includes determining, in a preliminary charging mode, a charging order between the first battery and the second battery, wirelessly transmitting, in a normal charging mode, first AC power having the first resonant frequency to the first sub resonant circuit when the first battery is selected according to the charging order, and wirelessly transmitting, in the normal charging mode, second AC power having the second resonant frequency to the second sub resonant circuit when the second battery is selected according to the charging order.

Determining the charging order may include wirelessly transmitting the first AC power during a first main time, recording first main sensing information indicating AC voltage and AC current of the first AC power, wirelessly transmitting first auxiliary power having a first auxiliary frequency during a first auxiliary time, recording first auxiliary sensing information indicating AC voltage and AC current of the first auxiliary power, determining a first DC voltage of the first battery based on the first main sensing information and the first auxiliary sensing information, wirelessly transmitting the second AC power during a second main time, recording second main sensing information indicating AC voltage and AC current of the second AC power, wirelessly transmitting second auxiliary power having a second auxiliary frequency during a second auxiliary time, recording second auxiliary sensing information indicating AC voltage and AC current of the second auxiliary power, determining a second DC voltage of the second battery based on the second main sensing information and the second auxiliary sensing information, and determining the charging order between the first battery and the second battery between the first DC voltage and the second DC voltage.

Advantageous Effects

According to at least one of the embodiments of the present disclosure, a single power transmitting device may wirelessly transmit an alternating charging current individually to the plurality of power receiving devices using magnetic resonance.

In addition, according to at least one of the embodiments of the present disclosure, it is possible to acquire (estimate) battery information of a battery connected to a power receiving device based on the voltage and current of alternating current (AC) power wirelessly transmitted to a power receiving device without wireless communication of the power transmitting device with each power receiving device.

The effects of the present disclosure are not limited to the effects mentioned above, and these and other effects will be clearly understood by those skilled in the art from the appended claims.

BRIEF DESCRIPTION OF THE DRAWINGS

The accompanying drawings illustrate a preferred embodiment of the present disclosure, and together with the detailed description of the present disclosure described below, serve to provide a further understanding of the technical aspects of the present disclosure, and thus the present disclosure should not be construed as being limited to the drawings.

DETAILED DESCRIPTION

Figure 1:
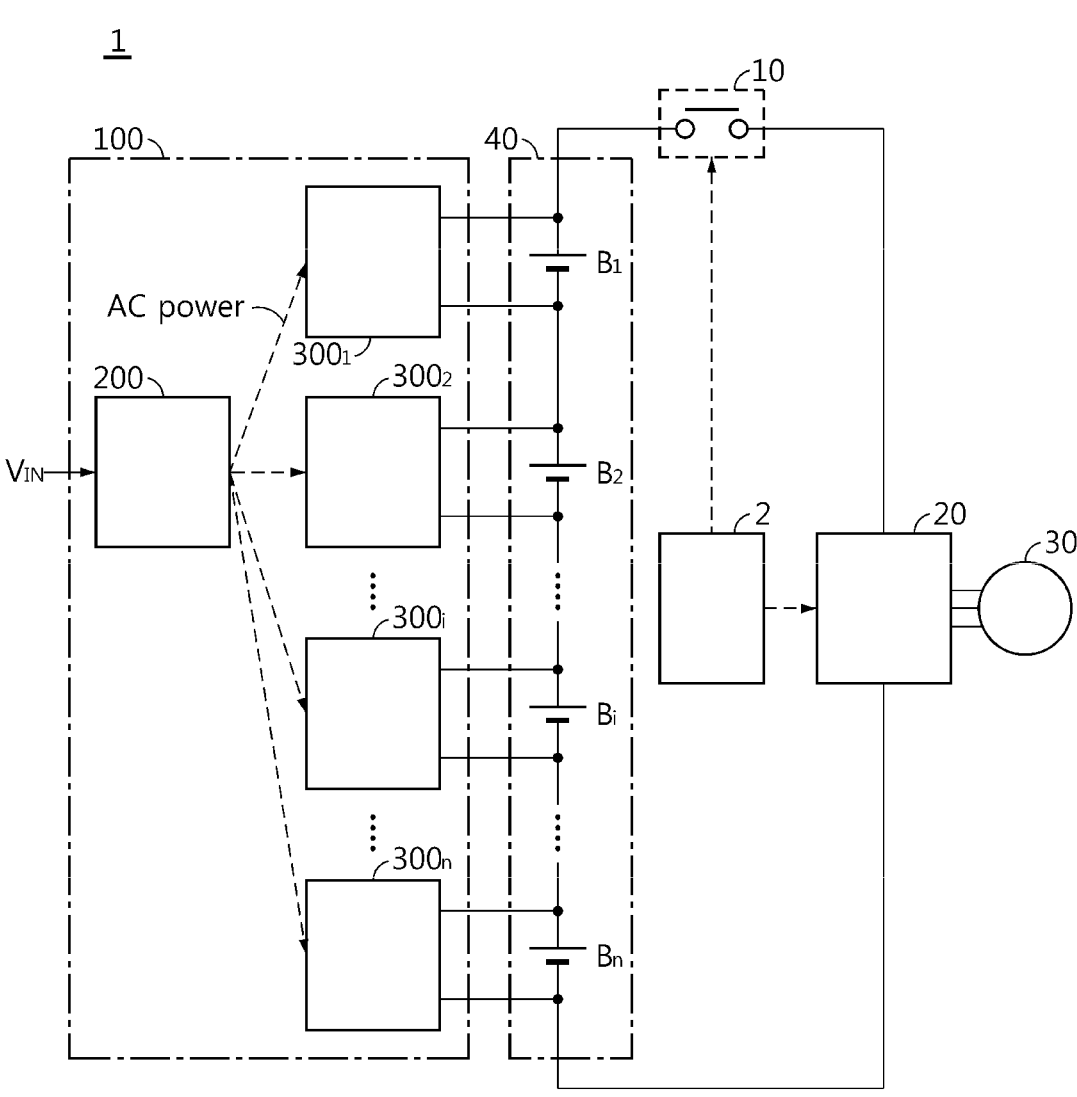
FIG. 1 is a diagram exemplarily showing a configuration of an electric vehicle according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

The terms including the ordinal number such as "first", "second" and the like, are used to distinguish one element from another among various elements, but not intended to limit the elements by the terms.

Unless the context clearly indicates otherwise, it will be understood that the term "comprises" when used in this specification, specifies the presence of stated elements, but does not preclude the presence or addition of one or more other elements.

In addition, throughout the specification, it will be further understood that when an element is referred to as being "connected to" another element, it can be directly connected to the other element or intervening elements may be present.

Figure 2:
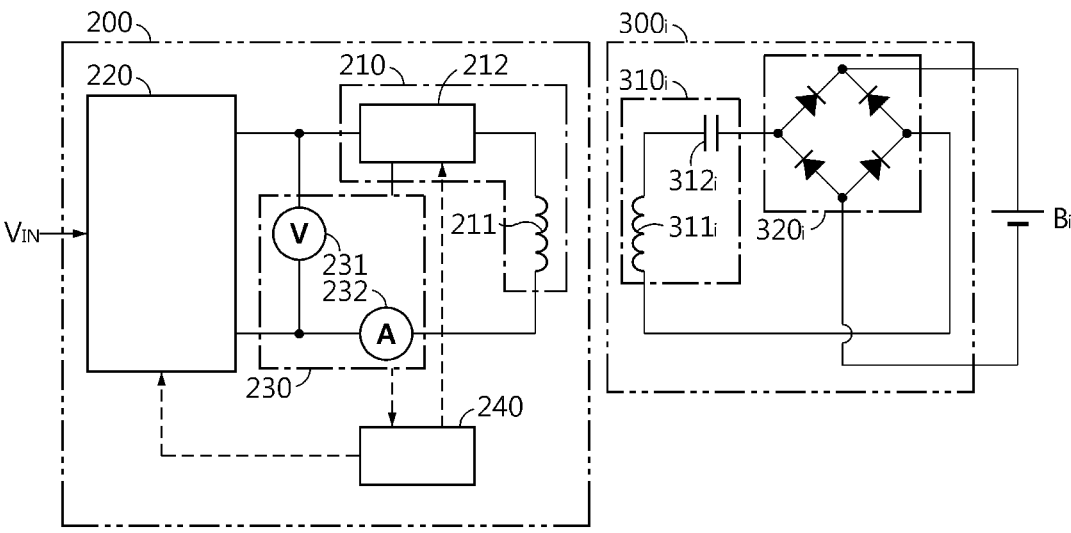
FIG. 2 is a diagram exemplarily showing a configuration of a power transmitting device and a power receiving device of FIG. 1.
Figure 3:
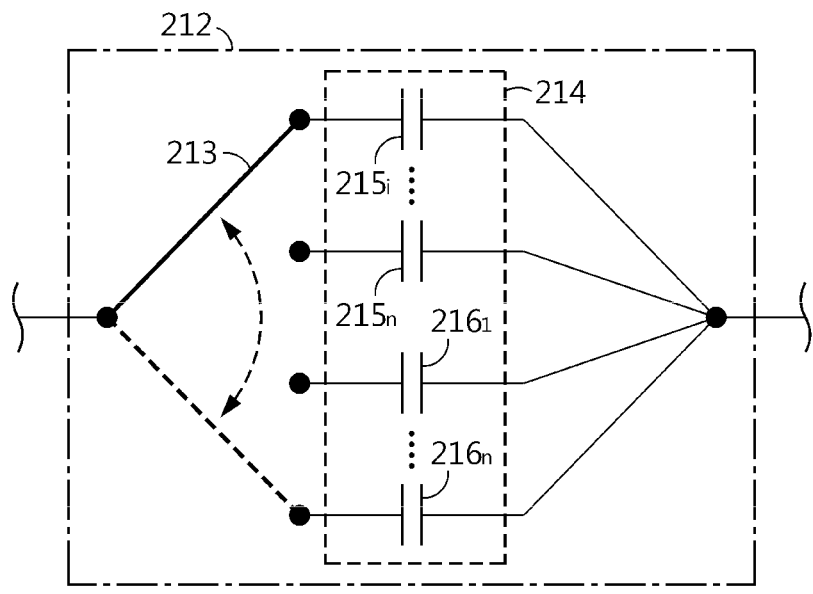
FIG. 3 is a diagram exemplarily showing a configuration of a variable capacitor of FIG. 2.

FIG. 1 is a diagram exemplarily showing a configuration of an electric vehicle 1 according to an embodiment of the present disclosure, FIG. 2 is a diagram exemplarily showing a configuration of a power transmitting device 200 and a power receiving device 300 of FIG. 1, and FIG. 3 is a diagram exemplarily showing a configuration of a variable capacitor 212 of FIG. 2.

Referring to FIGS. 1 to 3, the electric vehicle 1 includes a vehicle controller 2, a relay 10, an inverter 20, an electric motor 30, a battery group 40 and a wireless charging system 100.

The vehicle controller 2 is configured to generate a key-on signal in response to a user's switching of an ignition button (not shown) provided in the electric vehicle 1 to an ON-position. The vehicle controller 2 is configured to generate a key-off signal in response to the user's switching of the ignition button to an OFF-position.

The relay 10 is installed on a power line for the battery group 40. The on-off of the relay 10 may be controlled by the vehicle controller 2 and/or the wireless charging system 100. While the relay 10 is in an on-state, power may be transmitted from any one of the battery group 40 and the inverter from the other.

The inverter 20 converts direct current (DC) power supplied from the battery group 40 to alternating current (AC) power and supplies it to the electric motor 30. The electric motor 30 converts the AC power from the inverter 20 to kinetic energy for the electric vehicle 1. The electric motor may be, for example, a single-phase induction motor or a 3-phase induction motor.

The battery group 40 includes a plurality of batteries $B_1 \sim B_n$ connected in series. n is a natural number of 2 or greater. The battery B is not limited to a particular type, and includes any type of battery that can be charged and discharged repeatedly, such as, for example, a lithium ion battery.

The wireless charging system 100 includes a power transmitting device 200 and a plurality of power receiving devices $300_1 \sim 300_n$.

The plurality of power receiving devices $300_1 \sim 300_n$ is connected in parallel to the plurality of batteries $B_1 \sim B_n$ in a one-to-one relationship. That is, when i is a natural number of 1~n, the power receiving device $300_i$ is connected in parallel to the battery $B_i$.

The $i^{th}$ power receiving device $300_i$ is configured to wirelessly receive AC power having frequency in an $i^{th}$ range wirelessly transmitted from the power transmitting device 200 through magnetic resonance. The $i^{th}$ power receiving device $300_i$ charges the $i^{th}$ battery $B_i$ using the received AC power.

The power transmitting device 200 is configured to wirelessly transmit the AC power individually to the plurality of power receiving devices $300_1 \sim 300_n$. That is, to charge the $i^{th}$ battery $B_i$, the power transmitting device 200 may select the $i^{th}$ resonant frequency from first to $n^{th}$ resonant frequencies, and generate AC power having the selected $i^{th}$ resonant frequency.

Referring to FIG. 2, the $i^{th}$ power receiving device $300_i$ has an $i^{th}$ sub resonant circuit $310_i$. The $i^{th}$ sub resonant circuit $310_i$ has the $i^{th}$ resonant frequency. That is, when the frequency of the AC power transmitted by the power transmitting device 200 matches the $i^{th}$ resonant frequency, the $i^{th}$ sub resonant circuit $310_i$ is at the maximum magnetic resonance. As a difference between the frequency of the AC power transmitted by the power transmitting device 200 and the $i^{th}$ resonant frequency increases, the magnetic resonance of the $i^{th}$ sub resonant circuit $310_i$ gradually reduces.

The $i^{th}$ sub resonant circuit $310_i$ includes an $i^{th}$ sub coil $311_i$ and an $i^{th}$ sub capacitor $312_i$ connected in series. When $f_i$ is the $i^{th}$ resonant frequency, $L_{S\_i}$ is the inductance of the $i^{th}$ sub coil $311_i$, and $C_{S\_i}$ is the capacitance of the $i^{th}$ sub capacitor $312_i$, $f_i = 1/\{2\pi \times (C_{S\_i} \times L_{S\_i})^{0.5}\}$.

The $i^{th}$ power receiving device $300_i$ may further include an $i^{th}$ rectification circuit $320_i$. The $i^{th}$ rectification circuit $320_i$ may be a diode bridge circuit including 4 diodes. The $i^{th}$ rectification circuit $320_i$ includes a pair of input terminals and a pair of output terminals. The pair of input terminals of the $i^{th}$ rectification circuit $320_i$ are connected to a first terminal and a second terminal of the $i^{th}$ sub resonant circuit $310_i$ respectively. The pair of output terminals of the $i^{th}$ rectification circuit $320_i$ are connected to a first terminal (for example, a positive electrode terminal) and a second terminal (for example, a negative electrode terminal) of the $i^{th}$ battery $B_i$, respectively.

The power transmitting device 200 includes a main resonant circuit 210. The main resonant circuit 210 includes a main coil 211 and a variable capacitor 212 connected in series. A control circuit 240 is configured to adjust the capacitance of the variable capacitor 212 among first to $n^{th}$ main capacitance and first to $n^{th}$ auxiliary capacitance. That is, the capacitance of the variable capacitor 212 may be selected from the first to $n^{th}$ main capacitance and the first to $n^{th}$ auxiliary capacitance.

The resonant frequency of the main resonant circuit 210 may be adjusted to match the frequency of the AC power supplied to the main resonant circuit 210. Accordingly, the AC power generated by the main resonant circuit 210 may be wirelessly received by at least one of the plurality of power receiving devices $300_1$~$300_n$ by magnetic resonance. For example, when the AC power of the $i^{th}$ resonant frequency is inputted to the main resonant circuit 210, the resonant frequency of the main resonant circuit 210 may be adjusted to match the $i^{th}$ resonant frequency. Accordingly, the AC power having the $i^{th}$ resonant frequency may be transmitted to the $i^{th}$ sub resonant circuit $310_i$ through the main resonant circuit 210.

The power transmitting device 200 may further include a power generation circuit 220. The power generation circuit 220 is configured to convert the input DC power VIN supplied from a DC voltage source (for example, a lead acid battery) provided in the electric vehicle 1 or a charging station to AC power having a desired frequency. Well-known single-phase full-bridge inverters and/or oscillators may be used as the power generation circuit 220.

The frequency of the AC power generated by the power generation circuit 220 may be selected from first to $n^{th}$ resonant frequencies and first to $n^{th}$ auxiliary frequencies. The AC power having the selected frequency may be wirelessly transmitted as a charging signal to at least one of the plurality of power receiving devices $300_1$~$300_n$ through the main resonant circuit 210.

The power transmitting device 200 may further include a sensing circuit 230. The sensing circuit 230 includes a voltage sensor 231 and a current sensor 232. The sensing circuit 230 is configured to sense the AC voltage and AC current of the AC power supplied to the main resonant circuit 210, and transmit a signal indicating the sensed information to the control circuit 240.

The power transmitting device 200 may further include the control circuit 240. The control circuit 240 is operably coupled to at least one of the main resonant circuit 210, the power generation circuit 220 or the sensing circuit 230. The operably coupled refers to connection to enable signal transmission and reception in one or two directions.

The control circuit 240 may be implemented, in hardware, using at least one of application specific integrated circuits (ASICs), digital signal processors (DSPs), digital signal processing devices (DSPDs), programmable logic devices (PLDs), field programmable gate arrays (FPGAs), microprocessors or electrical units for performing other functions. The control circuit 240 may include an embedded memory. The memory may include, for example, at least one type of storage medium of flash memory type, hard disk type, Solid State Disk (SSD) type, Silicon Disk Drive (SDD) type, multimedia card micro type, random access memory (RAM), static random access memory (SRAM), read-only memory (ROM), electrically erasable programmable read-only memory (EEPROM) or programmable read-only memory (PROM). The memory may store data and programs required for the calculation operation by the control circuit 240. The control circuit 240 may store data indicating the result of the calculation operation in the memory.

The control circuit 240 may control the power generation circuit 220 and the main resonant circuit 210 to match the frequency of the AC power generated by the power generation circuit 220 to the frequency of the main resonant circuit 210. For example, when one of first to $n^{th}$ different resonant frequencies and first to $n^{th}$ different auxiliary frequencies is selected, the control circuit 240 may match each of the frequency of the AC power generated by the power generation circuit 220 and the resonant frequency of the main resonant circuit 210 to the selected frequency.

Referring to FIG. 3, the variable capacitor 212 includes a selection switch 213 and a capacitor circuit 214 connected in series. The capacitor circuit 214 may include first to $n^{th}$ main capacitors $215_1$~$215_n$ and first to $n^{th}$ auxiliary capacitors $216_1$~$216_n$ connected in parallel. In the specification, the capacitance of the $i^{th}$ main capacitor $215_i$ is referred to as '$i^{th}$ main capacitance', and the capacitance of the $i^{th}$ auxiliary capacitor $216_i$ is referred to as '$i^{th}$ auxiliary capacitance'.

Assume that $L_M$ is the inductance of the main coil 211, $C_{M\_i}$ is the $i^{th}$ main capacitance, and $C_{A\_i}$ is the $i^{th}$ auxiliary capacitance. When the $i^{th}$ main capacitor $215_i$ is selected by the selection switch 213, the frequency of the AC power wirelessly transmitted from the main resonant circuit 210 is $1/\{2\pi \times (C_{M\_i} \times L_M)^{0.5}\}$, and is equal to the $i^{th}$ resonant frequency. When the $i^{th}$ auxiliary capacitor $216_i$ is selected by the selection switch 213, the frequency of the AC power wirelessly transmitted from the main resonant circuit 210 is $1/\{2\pi \times (C_{A\_i} \times L_M)^{0.5}\}$, and is equal to the $i^{th}$ auxiliary frequency.

The $i^{th}$ auxiliary frequency may have the smallest difference with the $i^{th}$ resonant frequency among the first to $n^{th}$ resonant frequencies. For example, a difference between any two of the first to $n^{th}$ resonant frequencies may be larger than a predetermined value, and a difference between the $i^{th}$ auxiliary frequency and the $i^{th}$ resonant frequency may be less than a predetermined value. Accordingly, magnetic resonance by the $i^{th}$ auxiliary power is at the maximum in the $i^{th}$ sub resonant circuit $310_i$ among the first to $n^{th}$ sub resonant circuits $310_1$~$310_n$.

Prior to a normal charging mode for the plurality of batteries $B_1$~$B_n$, the first to $n^{th}$ auxiliary capacitors $216_1$~$216_n$ may be used in a preliminary charging mode for determining a charging order between the plurality of batteries $B_1$~$B_n$.

Figure 4:
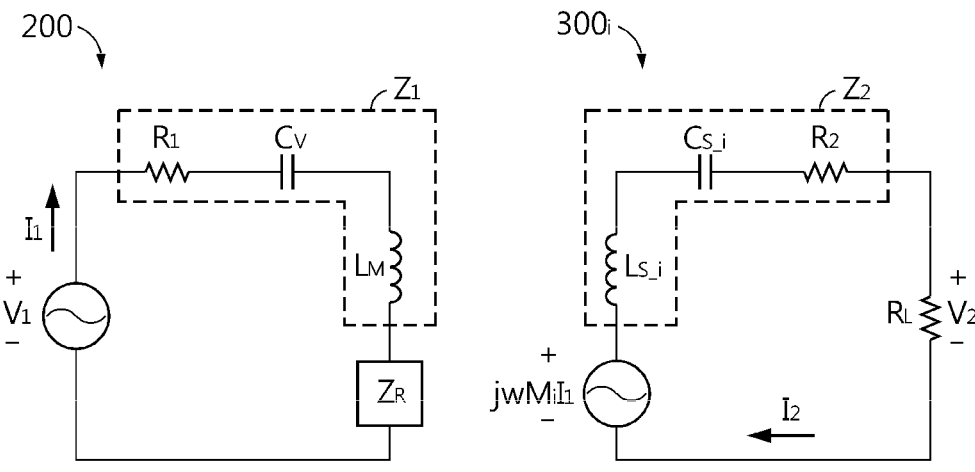
FIG. 4 is a diagram exemplarily showing an equivalent circuit of a power transmitting device and a power receiving device of FIG. 1 in phasor form.

FIG. 4 is a diagram exemplarily showing an equivalent circuit of the power transmitting device 200 and the power receiving device 300 of FIG. 1 in phasor form.

Referring to FIGS. 1 to 4, $V_1$ denotes the voltage phasor indicating the AC voltage of the main resonant circuit 210, $I_1$ denotes the current phasor indicating the AC current of the main resonant circuit 210, $Z_1$ denotes the equivalent impedance of the main resonant circuit 210, $Z_R$ denotes the combined impedance by the inductive coupling between the main coil 211 and the $i^{th}$ sub coil $311_i$, $V_2$ denotes the voltage phasor indicating the AC voltage of the $i^{th}$ sub resonant circuit $310_i$, $I_2$ denotes the current phasor indicating the AC current of the main resonant circuit 210, $Z_2$ denotes the equivalent impedance of the $i^{th}$ sub resonant circuit $310_i$, $R_L$ denotes the equivalent resistance of the $i^{th}$ rectification circuit $320_i$ and the $i^{th}$ the battery $B_i$, j means an imaginary number, and w means an angular frequency (w=$2\pi$f). In this instance, $Z_1$, $Z_2$ and $Z_R$ may be represented as the following Equations 1 to 3, respectively.

$$Z_1 = R_1 + j2\pi f L_M + 1/(j2\pi f C_V) \qquad \text{<Equation 1>}$$

In the above Equation 1, $R_1$=equivalent resistance of the main resonant circuit 210, $L_M$=inductance (main inductance) of the main coil 211, $C_V$=capacitance of the variable capacitor 212, $f = (L_M \times C_V)^{0.5}$.

$$Z_2 = j\omega L_{S\_i} + 1/(j2\pi f C_{S\_i}) + R_2 \qquad \text{<Equation 2>}$$

In the above Equation 2, $L_{S\_i}$=inductance of $i^{th}$ sub coil $311_i$, $C_{S\_i}$=capacitance of $i^{th}$ sub capacitor $312_i$, $R_2$=the equivalent resistance of $i^{th}$ sub resonant circuit $310_i$.

$$Z_R = (2\pi f M_i)^2/(Z_2 + R_L) \qquad \text{<Equation 3>}$$

In the above Equation 3, $M_i$=inductance between the main coil 211 and the $i^{th}$ sub coil $311_i$.

Accordingly, $V_1$, $I_1$, $V_2$ and $I_2$ satisfy the relationship of Equation 4 to Equation 6.

$$\frac{V_1}{I_1} = \frac{Z_1(Z_2 + R_L) + (2\pi f M_i)^2}{Z_2 + R_L} \qquad \text{< Equation 4 >}$$

$$I_2 = \frac{j2\pi f M_i I_1}{Z_2 + R_L} \qquad \text{< Equation 5 >}$$

$$V_2 = R_L I_2 \qquad \text{<Equation 6>}$$

In the above Equations 1 to 6, $R_1$, $L_M$ and $C_V$ are values indicating the unique characteristics of the main resonant circuit 210 and are pre-stored in the control circuit 240. $R_2$, $L_{S\_i}$ and $C_{S\_i}$ are values indicating the unique characteristics of the $i^{th}$ sub resonant circuit 310$_i$ and are pre-stored in the control circuit 240. f is a value selected from the first to $n^{th}$ resonant frequencies and the first to $n^{th}$ auxiliary frequencies, each frequency being preset. That is, among the parameters of Equation 4, only two parameters $R_L$ and $M_i$ are unknown.

Since there are two unknowns, each unknown may be determined (estimated) by acquiring two sensing information indicating $V_1$ and $I_1$ of Equation 4. Specifically, in the preliminary charging mode, the control circuit 240 may record $V_1$ and $I_1$ sensed by the sensing circuit 230 as the $i^{th}$ main sensing information when the $i^{th}$ resonant frequency is selected as f of Equation 4, and record $V_1$ and $I_1$ sensed by the sensing circuit 230 as the $i^{th}$ auxiliary sensing information when the $i^{th}$ auxiliary frequency is selected as f of Equation 4. Subsequently, the control circuit 240 may calculate $R_L$ and $M_i$ based on the $i^{th}$ main sensing information, the $i^{th}$ auxiliary sensing information and Equation 4. That is, the $i^{th}$ main sensing information indicates $V_1$ and $I_1$ of Equation 4 when f of Equation 4 is equal to the $i^{th}$ resonant frequency, and the $i^{th}$ auxiliary sensing information indicates $V_1$ and $I_1$ of Equation 4 when f of Equation 4 is equal to the $i^{th}$ auxiliary frequency. Accordingly, $R_L$ and $M_i$ may be determined as the solutions of simultaneous equations obtained from Equation 4.

The control circuit 240 may calculate $I_2$ of Equation 5 based on $R_L$, $M_i$ and $I_1$. The control circuit 240 may calculate $V_2$ of Equation 6 based on $R_L$ and $I_2$. That is, the control circuit 240 may calculate (estimate) the amplitude and phase of each of the AC voltage and AC current of the $i^{th}$ sub resonant circuit 310$_i$ based on the amplitude and phase of each of the AC voltage and AC current of the main resonant circuit 210. The $i^{th}$ AC power received by the $i^{th}$ sub resonant circuit 310$_i$ is converted to the $i^{th}$ DC power through the $i^{th}$ rectification circuit 320$_i$ and supplied to the $i^{th}$ battery $B_i$. The control circuit 240 may determine $i^{th}$ DC voltage which is a voltage across the $i^{th}$ battery to be equal to the voltage amplitude of $V_2$ of Equation 6. The $i^{th}$ DC voltage corresponds to a state of charge (SOC) of the $i^{th}$ battery $B_i$.

The power transmitting device 200 may determine first to $n^{th}$ DC voltages by performing the above-described process once for each of the plurality of sub resonant circuits. Assume n≥a>b>1. The $a^{th}$ DC voltage less than the $b^{th}$ DC voltage indicates that the SOC of the $a^{th}$ battery $B_a$ is less than the SOC of the $b^{th}$ battery $B_b$. The $a^{th}$ DC voltage larger than the $b^{th}$ DC voltage indicates that the SOC of the $a^{th}$ battery $B_a$ is larger than the SOC of the $b^{th}$ battery $B_b$. Accordingly, the control circuit 240 may determine the charging order between the first to $n^{th}$ batteries $B_1$~$B_n$ by arranging the first to $n^{th}$ DC voltages in order of magnitude.

10

Figure 5:
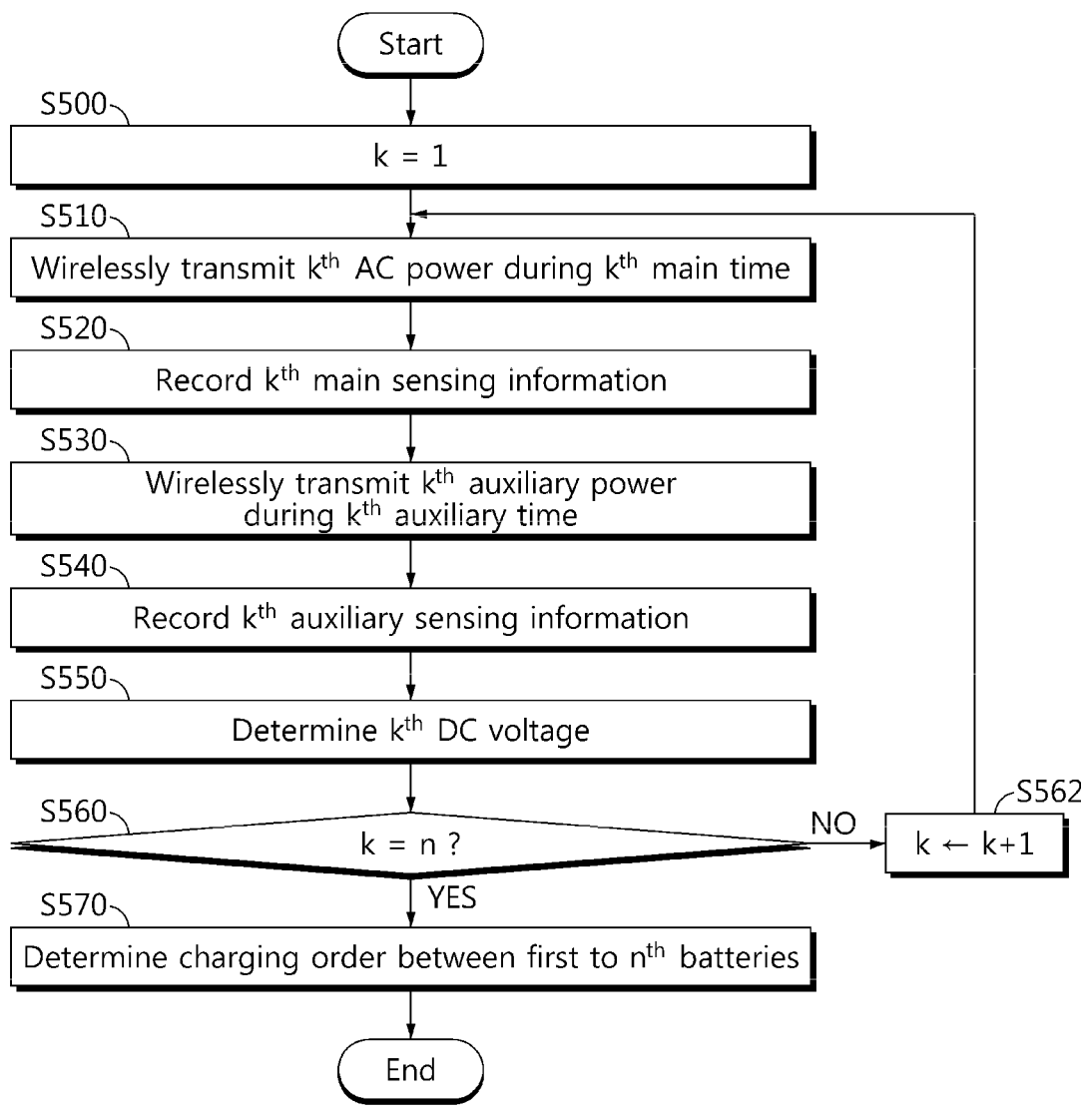
FIG. 5 is a flowchart exemplarily showing a wireless charging method according to a first embodiment of the present disclosure.

FIG. 5 is a flowchart exemplarily showing a wireless charging method according to a first embodiment of the present disclosure. The method of FIG. 5 may be performed to determine the charging order between the plurality of batteries $B_1$~$B_n$ in the preliminary charging mode.

Referring to FIG. 5, in step S500, the control circuit 240 of the power transmitting device 200 sets a first index k to be equal to 1.

In step S510, the power transmitting device 200 wirelessly transmits $k^{th}$ AC power during $k^{th}$ main time. Specifically, the control circuit 240 sets the resonant frequency of the main resonant circuit 210 to be equal to the $k^{th}$ resonant frequency during the $k^{th}$ main time. When $k^{th}$ resonant frequency=$f_k$, the $k^{th}$ main time may be preset to be equal to or larger than $1/f_k$. The $k^{th}$ AC power is AC power having the $k^{th}$ resonant frequency. For example, when the first index is 1, the first AC power having the first resonant frequency is wirelessly transmitted by the main resonant circuit 210 during the first main time.

In step S520, the power transmitting device 200 records $k^{th}$ main sensing information. The $k^{th}$ main sensing information may include the amplitude of each of the AC voltage and AC current of the $k^{th}$ AC power wirelessly transmitted from the power transmitting device 200 in step S510.

In step S530, the power transmitting device 200 wirelessly transmits $k^{th}$ auxiliary power having $k^{th}$ auxiliary frequency during $k^{th}$ auxiliary time. Specifically, the control circuit 240 sets the resonant frequency of the main resonant circuit 210 to be equal to the $k^{th}$ auxiliary frequency during the $k^{th}$ auxiliary time. The $k^{th}$ auxiliary time may be preset to be equal to or larger than $1/(k^{th}$ auxiliary frequency).

In step S540, the power transmitting device 200 records $k^{th}$ auxiliary sensing information. The $k^{th}$ auxiliary sensing information may include the amplitude of each of the AC current voltage and AC current of the $k^{th}$ auxiliary power wirelessly transmitted from the power transmitting device 200 in step S530.

In step S550, the power transmitting device 200 determines $k^{th}$ DC voltage based on the $k^{th}$ main sensing information and the $k^{th}$ auxiliary sensing information (see Equations 4 to 6).

In step S560, the power transmitting device 200 determines whether the first index k is equal to a target index n. The target index n is the total number of batteries B included in the wireless charging system 100. When a value of the step S560 is "No", step S562 is performed. When the value of the step S560 is "Yes", step S570 is performed.

In step S562, the power transmitting device 200 increases the first index k by 1. After the step S562, the method of FIG. 5 may move to the step S510.

In step S570, the power transmitting device 200 determines a charging order between the first to $n^{th}$ batteries $B_1$~$B_n$ based on the first to $n^{th}$ DC voltages. The control circuit 240 may arrange the first to $n^{th}$ DC voltages in an ascending order, and give higher charging orders to the batteries corresponding to lower DC voltages. For example, when the first DC voltage is less than the second DC voltage, the control circuit 240 gives a higher charging order than the second battery $B_2$ to the first battery $B_1$ so that the first battery $B_1$ has priority over the second battery $B_2$, and in other cases, gives a higher charging order than the first battery $B_1$ to the second battery $B_2$. The control circuit 240 may store a flag indicating the charging order of each of the first to $n^{th}$ batteries $B_1$~$B_n$ in the memory.

Figure 6:
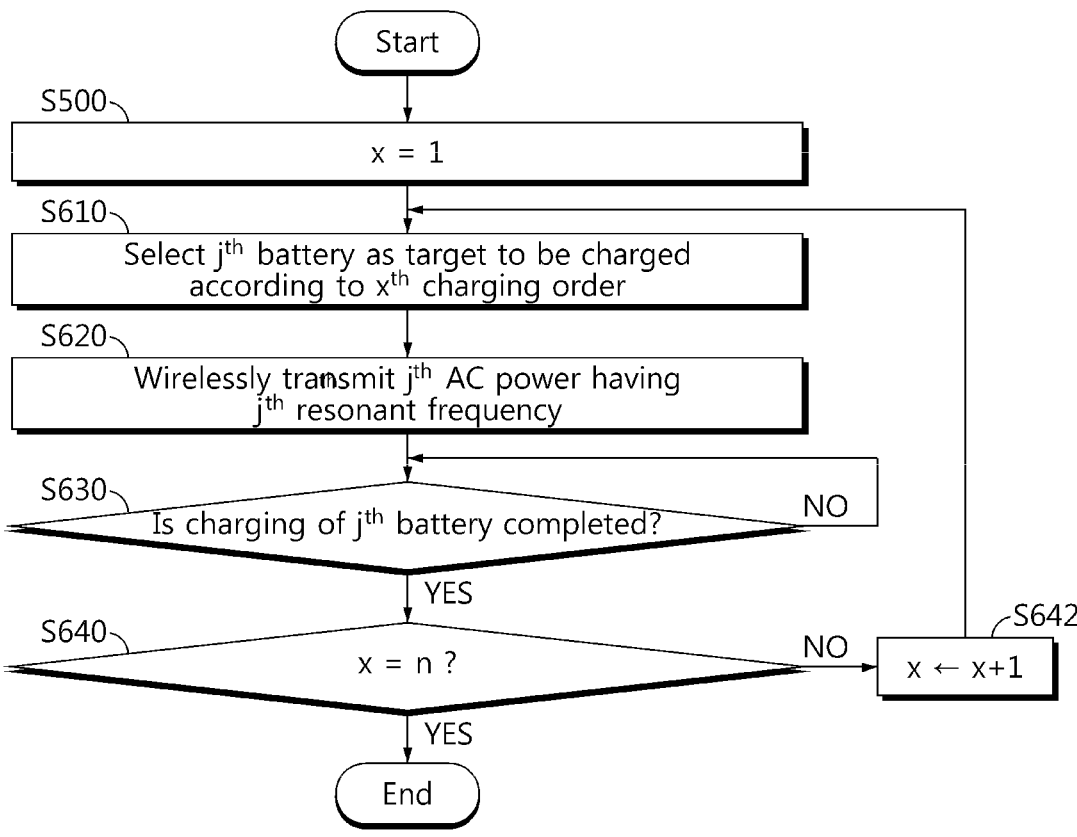
FIG. 6 is a flowchart exemplarily showing a wireless charging method according to a second embodiment of the present disclosure.

FIG. 6 is a flowchart exemplarily showing a wireless charging method according to a second embodiment of the present disclosure. The method of FIG. 6 may be performed to sequentially charge the plurality of batteries $B_1$~$B_n$ in the normal charging mode according to the charging order determined through the method of FIG. 5.

In step S600, the power transmitting device 200 sets a second index x to 1. The second index x indicates the charging order.

In step S610, the power transmitting device 200 selects the $j^{th}$ battery $B_j$, one of the first to $n^{th}$ batteries $B_1$~$B_n$, as a target to be charged according to the $x^{th}$ charging order. The $j^{th}$ battery $B_j$ is assigned with the $x^{th}$ highest charging rank among the first to $n^{th}$ batteries $B_1$~$B_n$.

In step S620, the power transmitting device 200 wirelessly transmits $j^{th}$ AC power having $j^{th}$ resonant frequency associated with the battery $B_j$ selected in the step S610. In the step S620, the $j^{th}$ AC power having the $j^{th}$ resonant frequency is wirelessly transmitted. Accordingly, the $j^{th}$ AC power is wirelessly received by the $j^{th}$ sub resonant circuit.

In step S630, the power transmitting device 200 determines whether the charging of the $j^{th}$ battery $B_j$ is completed. Specifically, the control circuit 240 determines DC voltage of the $j^{th}$ battery $B_j$ at a predetermined time interval during the charge of the $j^{th}$ battery $B_j$ (see Equations 4 to 6), and when the DC voltage of the $j^{th}$ battery $B_j$ reaches a preset upper limit of voltage, determine that the charging is completed. When a value of the step S630 is "No", the step S630 may be repeated. When the value of the step S630 is "Yes", step S640 is performed.

In step S640, the power transmitting device 200 determines whether the second index x is equal to a target index n. The target index n is the total number of batteries B included in the wireless charging system 100. When a value of the step S640 is "No", step S642 is performed. The value of the step S640 being "Yes" indicates that charging of all the first to $n^{th}$ batteries $B_1$~$B_n$ is completed.

In step S642, the power transmitting device 200 increases the second index x by 1. After the step S642, the method of FIG. 6 may move to the step S610.

The embodiments of the present disclosure described hereinabove are not implemented only through the apparatus and method, and may be implemented through programs that perform functions corresponding to the configurations of the embodiments of the present disclosure or recording media having the programs recorded thereon, and such implementation may be easily achieved by those skilled in the art from the disclosure of the embodiments previously described.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Additionally, as many substitutions, modifications and changes may be made to the present disclosure described hereinabove by those skilled in the art without departing from the technical aspects of the present disclosure, the present disclosure is not limited by the above-described embodiments and the accompanying drawings, and some or all of the embodiments may be selectively combined to allow various modifications.

What is claimed is:

1. A wireless charging system, comprising:
   a first power receiving device connected in parallel to a first battery, and including a first sub resonant circuit having a first resonant frequency;

a second power receiving device connected in parallel to a second battery, and including a second sub resonant circuit having a second resonant frequency; and
   a power transmitting device including a main resonant circuit,
   wherein the power transmitting device is configured to:
   determine, in a preliminary charging mode, a charging order between the first battery and the second battery,
   wirelessly transmit, in a normal charging mode, first alternating current (AC) power having the first resonant frequency to the first sub resonant circuit through the main resonant circuit when the first battery is selected according to the charging order, and
   wirelessly transmit, in the normal charging mode, second AC power having the second resonant frequency to the second sub resonant circuit through the main resonant circuit when the second battery is selected according to the charging order,
   wherein the power transmitting device is configured to, in the preliminary charging mode,
   wirelessly transmit the first AC power during a first main time,
   record first main sensing information indicating AC voltage and AC current of the first AC power,
   wirelessly transmit first auxiliary power having a first auxiliary frequency during a first auxiliary time,
   record first auxiliary sensing information indicating AC voltage and AC current of the first auxiliary power,
   determine a first DC voltage of the first battery based on the first main sensing information and the first auxiliary sensing information,
   wirelessly transmit the second AC power during a second main time,
   record second main sensing information indicating AC voltage and AC current of the second AC power,
   wirelessly transmit second auxiliary power having a second auxiliary frequency during a second auxiliary time,
   record second auxiliary sensing information indicating AC voltage and AC current of the second auxiliary power,
   determine a second DC voltage of the second battery based on the second main sensing information and the second auxiliary sensing information, and
   determine the charging order between the first battery and the second battery based on the first DC voltage and the second DC voltage.

2. The wireless charging system according to claim 1, wherein the power transmitting device further includes:
   a power generation circuit configured to selectively supply the main resonant circuit with the first AC power, the first auxiliary power, the second AC power and the second auxiliary power;
   a sensing circuit configured to sense the AC voltage and the AC current of the first AC power, the second AC power and the second auxiliary power supplied to the main resonant circuit; and
   a control circuit operably coupled to the main resonant circuit, the power generation circuit and the sensing circuit.

3. The wireless charging system according to claim 2, wherein the main resonant circuit includes a main coil and a variable capacitor connected in series, and
   the control circuit is configured to adjust a capacitance of the variable capacitor to be equal to one of a first main capacitance, a first auxiliary capacitance, a second main capacitance and a second auxiliary capacitance that are different from one another.

4. The wireless charging system according to claim 3, wherein the first resonant frequency is equal to a resonant frequency by a main inductance of the main coil and the first main capacitance, the first auxiliary frequency is equal to a resonant frequency by the main inductance and the first auxiliary capacitance, the second resonant frequency is equal to a resonant frequency by the main inductance and the second main capacitance, and the second auxiliary frequency is equal to a resonant frequency by the main inductance and the second auxiliary capacitance.

5. An electric vehicle comprising the wireless charging system according to claim 1.

6. A wireless charging method for a first battery connected in parallel to a first sub resonant circuit having a first resonant frequency and a second battery connected in parallel to a second sub resonant circuit having a second resonant frequency, the wireless charging method comprising:

determining, in a preliminary charging mode, a charging order between the first battery and the second battery;

wirelessly transmitting, in a normal charging mode, first alternating current (AC) power having the first resonant frequency to the first sub resonant circuit when the first battery is selected according to the charging order; and wirelessly transmitting, in the normal charging mode, second AC power having the second resonant frequency to the second sub resonant circuit when the second battery is selected according to the charging order, wherein determining the charging order comprises:

wirelessly transmitting the first AC power during a first main time;

recording first main sensing information indicating AC voltage and AC current of the first AC power;

wirelessly transmitting first auxiliary power having a first auxiliary frequency during a first auxiliary time;

recording first auxiliary sensing information indicating AC voltage and AC current of the first auxiliary power;

determining a first direct current (DC) voltage of the first battery based on the first main sensing information and the first auxiliary sensing information;

wirelessly transmitting the second AC power during a second main time;

recording second main sensing information indicating AC voltage and AC current of the second AC power;

wirelessly transmitting second auxiliary power having a second auxiliary frequency during a second auxiliary time;

recording second auxiliary sensing information indicating AC voltage and AC current of the second auxiliary power;

determining a second DC voltage of the second battery based on the second main sensing information and the second auxiliary sensing information; and determining the charging order between the first battery and the second battery between the first DC voltage and the second DC voltage.

\* \* \* \* \*